US006185421B1

(12) United States Patent
Alperovich et al.

(10) Patent No.: US 6,185,421 B1
(45) Date of Patent: Feb. 6, 2001

(54) SYSTEM, APPARATUS AND METHOD FOR PAGING OPTIMIZATION USING SUB-LOCATION AREAS

(75) Inventors: Vladimir Alperovich; Gunnar Borg, both of Dallas, TX (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/112,663

(22) Filed: Jul. 9, 1998

(51) Int. Cl.[7] .................................................. H04Q 7/20
(52) U.S. Cl. ............................................. 455/433; 455/456
(58) Field of Search .................................... 455/432, 433, 455/435, 456, 457, 445, 422, 517, 524

(56) References Cited

FOREIGN PATENT DOCUMENTS

WO 95/11577    4/1995  (WO) .

OTHER PUBLICATIONS

Kwan L. Yeung and Tak–Shing P. Yum; A Comparative Study on Location Tracking Strategies in Cellular Mobile Radio Systems; IEEE Global Telecommunications Conference, Singapore, Nov. 14–16, 1995, vol. 1, Nov. 14, 1999; pp. 22–28.

Hai Xie, Sami Tabbane and David J. Goodman; Dynamic Location Area Management and Performance Analysis; IEEE Personal Communication—Freedom Though Wireless Technology, Secaucus, New Jersey; May 18–20, 1993, Conf. No. 43, May 18, 1993; pp. 536–539.
PCT International Search Report dated Nov. 3, 1999.

*Primary Examiner*—Reinhard J. Eisenzopf
*Assistant Examiner*—Sam Bhattacharya
(74) *Attorney, Agent, or Firm*—Jenkens & Gilchrist, P.C.

(57) ABSTRACT

A telecommunications system, apparatus and method is disclosed for optimizing the use of paging channels within the network by dividing location areas (LAs) into sub-location areas (sub-LAs) and providing a more efficient and flexible method of paging mobile subscribers. The amount of usage of the paging channels and the number of location updates performed by a mobile subscriber can be monitored by the network to determine either statistical data or a subscriber category, e.g., heavy-user or light-user, which can be stored within the Subscriber Identity Module (SIM) card within the mobile station (MS). The sub-LA information along with the LA information for the cell that the mobile terminal is in is broadcast and monitored by the SIM card within the MS, which can then perform location updates based upon the category or data. The Mobile Switching Center/Visitor Location Register can also use the data or category for paging purposes, e.g., either page within the entire LA or within only the sub-LA, for more focused paging.

43 Claims, 2 Drawing Sheets

SYSTEM, APPARATUS AND METHOD FOR PAGING OPTIMIZATION USING SUB-LOCATION AREAS

BACKGROUND OF THE PRESENT INVENTION

1. Field of the Invention

The present invention relates generally to a telecommunications system, apparatus and method for paging mobile terminals within a cellular network, and specifically to optimizing use of paging channels by dividing location areas into sub-location areas and providing a more flexible and efficient method of paging mobile subscribers.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLNN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If an MS 20 roams into a new MSC/VLR area 12, the MSC 14 will request data about that Mobile Station 20 from the HLR database 26 (simultaneously informing the HLR 26 about the current location of the MS 20) and store the data in the VLR 16 connected to that MSC 14. Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The radio interface is the general name of the connection between the MS 20 and the BTS 24, which utilizes timeslots (TS) within each allocated frequency to transmit speech, data and control signaling, with each TS being referred to as a physical channel. Different types of information, e.g., speech, user data and control signaling, must be transmitted on these physical channels through the use of logical channels, which are mapped onto the physical channels. The logical channels can be divided into two groups: control channels and traffic channels. Speech is sent on the traffic channels, while user data and control signaling are transmitted on control channels.

One type of control channel is a paging channel (PCH) to which the MS 20 listens to see if the network 10 wants to get in contact with the MS 20. For example, the network 10 may wish to get in contact with the MS 20 because the network 10 is receiving an incoming call or a Short Message Service (SMS) message for the MS 20. The information on a PCH is a paging message, which includes the MS's identity number. The paging message is transmitted to the MS 20 on the downlink (from the BTS 24 to the MS 20), as a broadcast message.

The paging channels are a valuable network resource, and thus, optimization of their use will lead to better network frequency utilization and traffic throughput. With the increase in traffic, such as point-to-point SMS messages, the paging capacity is likely to become a bottleneck in the system.

When a subscriber moves from one LA 18 to another, a procedure called Location Update is performed to inform the network 10 where to page the MS 20 in case of an incoming call or message. In general, the smaller the LA 18, the more Location Updates are generated by MS's 20 moving between LA's 18. However, if the LA 18 is large, which corresponds to a large number of cells 22, when a mobile terminating call comes into the network 10, the called subscriber (MS 20) is paged within the entire LA 18, which includes every cell 22 in the LA 18. Therefore, each BTS 24 within each cell 22 sends a paging message on a separate PCH.

Thus, the larger the LA 18, the more network resources (paging channels) are used to page a MS 20 within the LA 18. In sum, there is a trade-off between paging efficiency (most efficient when the LA 18 is small) and the Location Update load (most efficient when the LA 18 is large). However, the size of the LA 18 is typically configured for an average subscriber, while in reality, there are some subscribers, such as business subscribers, who use the MS 20 heavily. For these heavy-use subscribers, a smaller LA 18 is preferred, because these subscribers are paged frequently. In addition, there are also some subscribers who only use the MS 20 for emergencies. For these light-use subscribers, a large LA 18 is preferred, because the paging activity is minimal. Existing technology has not provided a way to maximize network resources (paging channels) based upon the subscriber usage.

It is, therefore, an object of the present invention to optimize the use of paging channels based upon the usage characteristics for subscribers within the network.

SUMMARY OF THE INVENTION

The present invention is directed to a telecommunications system, apparatus and method for optimizing the use of paging channels within the network by dividing location areas (LAs) into sub-location areas (sub-LAs) and providing a more flexible and efficient method of paging mobile subscribers. The amount of usage of the paging channels and the number of location updates performed by a mobile subscriber can be monitored by the network to determine either a ratio of the number of pages to the number of location updates, or a subscriber category associated with the mobile subscriber. The ratio or subscriber category, e.g., heavy-user or light-user and high-mobility or low-mobility, can be stored within the Subscriber Identity Module (SIM) card within the mobile terminal. Alternatively, the SIM card itself can monitor the paging and location update activity over time and make a determination as to the ratio or subscriber category. When the LA is divided into sub-LAs, the sub-LA information is broadcast over the broadcast channel together with the LA information. The SIM card within the MS can then monitor the broadcast channel and perform location updates based upon the subscriber category or ratio. For example, if the subscriber category is set to heavy/business-use or the ratio is above a threshold percentage for sub-LA location updating, e.g., the number of pages attempted by the subscriber is greater than the number of location updates attempted by the subscriber by a certain percentage, the mobile terminal performs location updates when the boundary between two sub-LA's is crossed. However, for light-use subscribers or if the ratio is below the threshold for sub-LA location updating, location updates are only performed when a boundary between two LAs is crossed. When a location update is performed, the subscriber category or ratio for that mobile terminal is passed onto the MSC/VLR for paging purposes, e.g., either page within the entire LA or within only the sub-LA. As a result, more focused paging is performed for the subscribers who are paged more frequently. It should be noted that the paging (either LA or sub-LA) can also be tailored by location, time and mobility of the subscriber.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
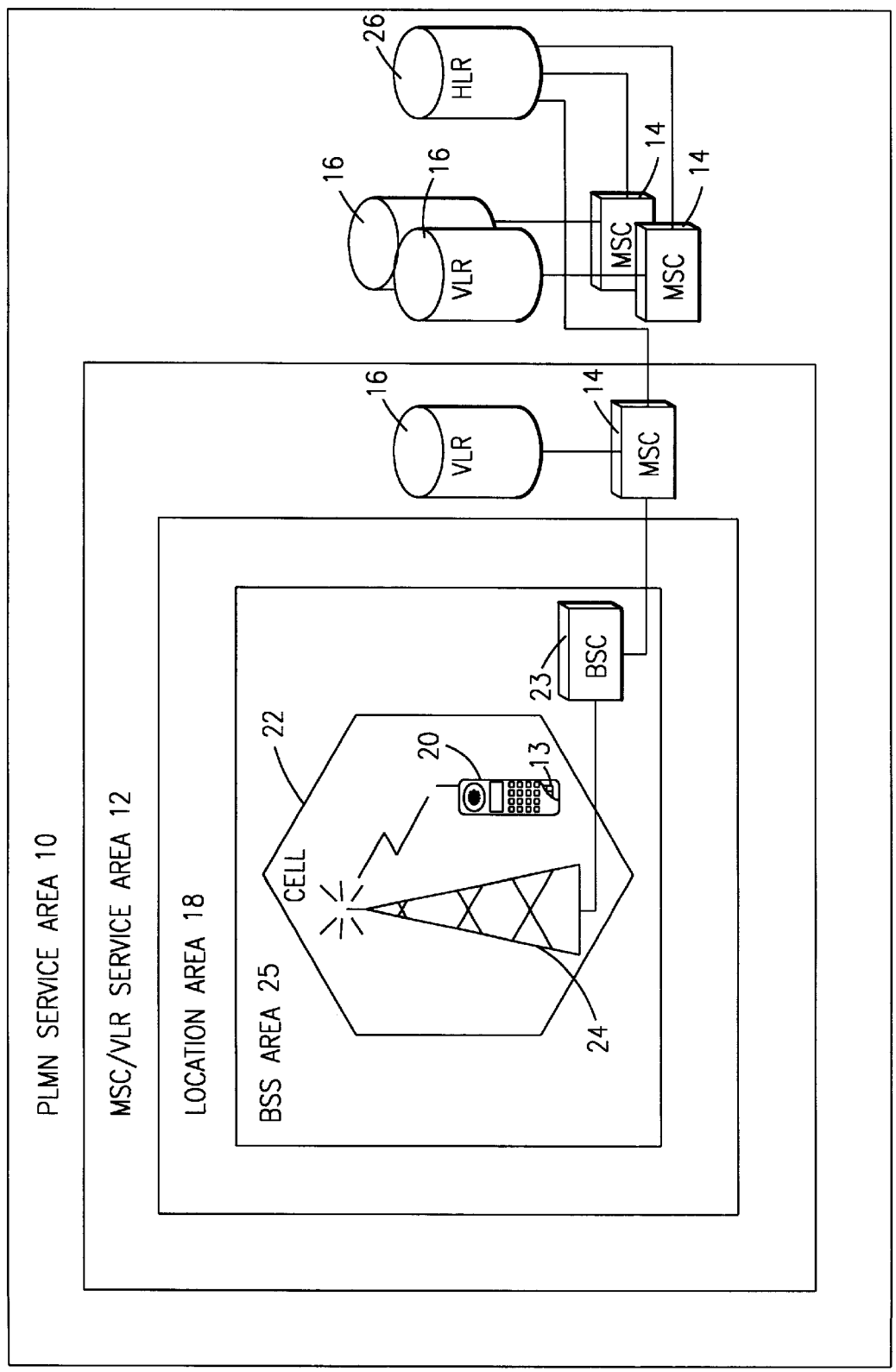
FIG. 1 is a block diagram of a conventional terrestrially-based wireless telecommunications system.
Figure 2:
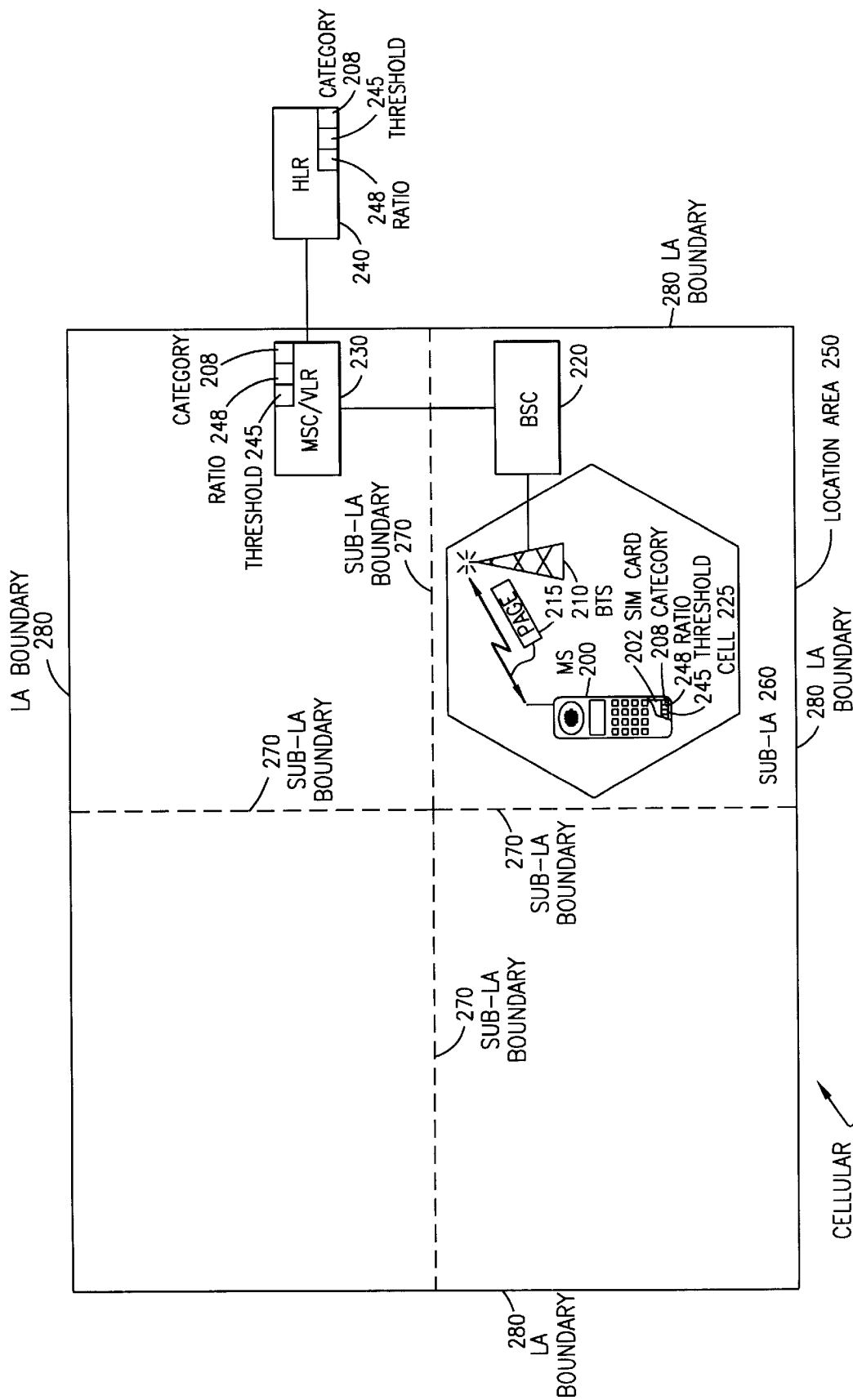
FIG. 2 is a block diagram illustrating the division of Location Areas into sub-Location Areas in order to maximize efficient usage of paging channels.

With reference now to FIG. 2 of the drawings, optimization of the use of paging channels 215 within a cellular network 205 can be achieved by dividing location areas (LA) 250 into sub-location areas (sub-LA) 260 and providing a more flexible and efficient method of paging Mobile Stations (MS) 200 within the cellular network 205 related to the amount of usage of the paging channels 215 by the MS's 200. In one embodiment, the cellular network, e.g., a Home Location Register (HLR) 240, can maintain statistical data for each MS 200, which can include, for example, the number of pages 215 to a specific MS 200 over a predefined period of time, the number of pages 215 for that specific MS 200 per LA 250, the mobility of the subscriber, e.g., the number of location updates performed by that MS 200, and the peak time(s) of paging activity for that subscriber.

From this statistical data, the network 205 can determine, for example, a ratio 248 for the MS 200 of the number of paging attempts by the network 205 to the number of location update attempts by the MS 200. The higher the ratio 248, the more focused the paging activity should be. Thus, the ratio 248 can be compared with threshold ratios 245 to determine whether the MS 200 should be paged within the entire LA 250 or within the sub-LA 260 and whether the MS 200 should perform location updates between LA's 250 or between sub-LA's 260.

This ratio 248 and threshold information 245 can be sent to the MS 200 for storage in, for example, a Subscriber Identity Module (SIM) card 202, or other memory, therein in order for the MS 200 to determine when to perform location updates. In addition, when the MS 200 performs a location update, the MS 200 and the HLR 240 can send this ratio 248 and threshold information 245 to a Mobile Switching Center/Visitor Location Register (MSC/VLR) 230 serving the LA 250 that the MS 200 is currently located in to enable the MSC/VLR 230 to determine whether to page the MS 200 within the entire LA 250 or only within the sub-LA 260. If the ratio 248 and threshold information 245 sent by the MS 200 differs from that sent by the HLR 240, the MSC/VLR 230 can then send the new ratio 248 and threshold information 245, corresponding to the information 248 and 245 sent by the HLR 240, to the MS 200 for storage in the SIM card 202. Alternatively, the MSC/VLR 230 can maintain its own threshold information 245 for comparison with the ratio information sent by the MS 200 and HLR 240.

In an alternative embodiment, the HLR 240 can use the statistical data to determine a subscriber category 208, e.g., heavy-user or light-user, which can then be sent to the MS 20 and stored within the SIM card 202 within the MS 200. It should be understood that other subscriber categories can be used instead of the heavy-user and light-user categories discussed herein. For example, the subscriber category can be broken down into two categories 208, one for the paging activity and one for the location update activity, e.g., either heavy-user or light-user, and either high-mobility or light-mobility. The MS 200 can use the high-mobility or light-mobility categories 208 for location updating, while the MSC/VLR 230 can use the heavy-user or light-user categories 208 for paging purposes.

In a further alternative embodiment, the subscriber category 208 (heavy-user or light-user) can be determined at the time of subscription, which can be based upon the subscription plan chosen. As an example, if a subscriber chooses a plan with 500 or more minutes a month, a heavy-user subscriber category 208 can be assigned to that MS 200 and stored in the SIM card 202. This subscriber category 208 can also be stored in the subscriber's Home Location Register (HLR) 240, which can then transfer the subscriber category 208 to a Mobile Switching Center/Visitor Location Register (MSC/VLR) 230 serving the LA 250 that the MS 200 is currently located in.

In another alternative embodiment, the SIM card 202 itself can monitor the paging and location update activity of the MS 200 over time and make a determination as to the ratio 248 or subscriber category 208. For example, if the MS 200 receives at least a threshold amount of paging messages 215 as compared to the number of location updates within a predefined period of time, the SIM card 202 can assign a heavy-user subscriber category 208 to the MS 200. By allowing the SIM card 202 to monitor the paging and location update activity, the subscriber category 208 can change dynamically depending upon the paging channel 215 usage by that MS 200 during predefined periods of time.

In another alternative embodiment, the utilization of the paging channels 215 in general can be monitored by the cellular network 205, e.g., Base Station Controllers (BSC) 220 and/or Base Transceiver Stations (BTS) 210 within the LA 250, and this paging channel utilization information can then be sent to the serving MSC/VLR 230, which can then modify the subscriber categories 208 for subscribers in the LA 250 based upon the high utilization of the paging resources 215 in general, instead of the individual paging utilization.

When the ratio 248 and threshold information 245 or subscriber category 208 for the MS 200 is first determined or changes, this information 248 and 245 or 208 can then be sent to the MS 200, using, for example, an Unstructured Supplementary Service Data (USSD) message or a Short Message Service (SMS) message, to be stored in the SIM card 202 or other memory of the MS 200. In addition, if the ratio 248, threshold information 245 or subscriber category 208 for the MS 200 changes based upon the time of day, the SIM card 202 can store each ratio 248, threshold information 245 or subscriber category 208 along with the associated time of day and change the current ratio 248, threshold information 245 or subscriber category 208 itself based upon the time stamp information sent over the broadcast channel by the serving BTS 210.

When each LA 250 is divided into sub-LA's 260, each BTS 210 within the cellular network 205 can broadcast the sub-LA 260 information along with the LA 250 information associated with a cell 225 that the BTS 210 is located in. The SIM card 202 within the MS 200 can then monitor the broadcast channel and perform location updates based upon the ratio 248 or subscriber category 208 stored in the MS 200. For example, if the ratio 248 is below the threshold 245 for performing sub-LA 260 location updates, e.g., the number of pages is low as compared with the number of location updates, or the subscriber category 208 is high-mobility or light-user, location updates can be performed by the MS 200 when the boundary 270 between two sub-LAs 260 is crossed. Alternatively, for high ratios 248 (more pages than location updates) or low-mobility of heavy-user subscriber categories 208, location updates need to be performed only when the boundary 280 between two LAs 250 is crossed.

As discussed hereinbefore, the MSC/VLR 230 also stores the ratio 248 and threshold information 245 or subscriber category information 208 for the MS 200, which can be sent by the MS 200 in the location update, sent by the HLR 240 along with additional subscriber information after the MS 200 performs the location update if the subscriber category 208 is new or different than the subscriber category 208 sent by the MS 200 in the location update, or determined by the MSC/VLR 230 based upon the overall paging utilization. If the ratio 248 or subscriber category 208 sent by the HLR 240 is new or different from the ratio 248 or subscriber category 208 sent by the MS 200 in the location update, the MSC/VLR 230 can then send this new ratio 248 or subscriber category 208 to the MS 200 for use by the MS 200 in future location updates.

The MSC/VLR 230 uses this ratio 248 or subscriber category 208 to determine whether to page 215 the MS 200 within the entire LA 250 or within only one sub-LA 260. For example, if the ratio 248 is high or the subscriber category 208 is heavy-user, the MSC/VLR 230 can page 215 the MS 200 in the sub-LA 260, thus reducing the amount of network resources (paging channels 215) utilized by the network 205 to get in contact with the MS 200. However, if the ratio 248 is low or the subscriber category 208 is light-user, the MSC/VLR 230 can page 215 the MS 200 within the entire LA 250.

As a result, more focused paging 215 is performed for the subscribers who are paged more frequently. It should be noted that the ratio 248 or subscriber category 208 can also be tailored by location, time and mobility of the subscriber. In addition, sub-LAs 260 can in turn be divided into further sub-LA's (not shown) along with associated thresholds 245 or subscriber categories 208.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that the paging channel efficiency systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for optimizing the use of paging channels within a cellular network, said telecommunications system comprising:

at least one location area within said cellular network, said location area being divided into at least two sub-location areas;

a mobile terminal in wireless communication with a mobile switching center within said cellular network, said mobile terminal being located within a given one of said sub-location area; and a memory having threshold information and paging and updating information associated with said mobile terminal stored therein, said paging and updating information comprising a ratio of the number of pages attempted by said mobile switching center to said mobile terminal to the number of location updates attempted by said mobile terminal to said mobile switching center;

wherein said mobile switching center pages said mobile terminal on said paging channels within said given sub-location area and not on said paging channels within at least one other of said at least two sub-location areas when the value of said ratio is above said threshold information;

wherein said mobile switching center pages said mobile terminal on said paging channels within said location area when the value of said ratio is below said threshold information.

2. The telecommunications system of claim 1, wherein said paging and updating information is associated with the amount of usage of said paging channels by said mobile terminal.

3. The telecommunications system of claim 1, wherein said memory is within said mobile terminal.

4. The telecommunications system of claim 3, wherein said memory is a Subscriber Identity Module card.

5. The telecommunications system of claim 3, wherein said paging and updating information is determined by said memory within said mobile terminal.

6. The telecommunications system of claim 1, wherein said paging and updating information is associated with a predefined time period, said paging and updating information being updated at the end of said predefined time period.

7. The telecommunications system of claim 1, further comprising at least one base station in wireless communication with said mobile terminal and connected to said mobile switching center, said base station being located within said given sub-location area, said paging channels being associated with said base station, said base station broadcasting information associated with said location area and said given sub-location area.

8. The telecommunications system of claim 1, wherein said mobile terminal performs a location update to said mobile switching center when said mobile terminal enters said location area but not when said mobile terminal enters one of said at least two sub-location areas when the value of said ratio is below said threshold information.

9. The telecommunications system of claim 1, further comprising a home location register connected to said mobile switching center, said memory being within said home location register.

10. The telecommunications system of claim 9, wherein said home location register sends, via said mobile switching center, said paging and updating information to said mobile terminal to be stored in a memory therein.

11. The telecommunications system of claim 9, wherein said home location register sends paging and updating information to said mobile switching center, said mobile switching center using said paging and updating information to determine whether to page said mobile terminal within said location area or within said given sub-location area.

12. The telecommunications system of claim 1, wherein said memory is within said mobile terminal, said paging and updating information being determined and sent to said mobile terminal by said mobile switching center.

13. The telecommunications system of claim 1, wherein each of said sub-location areas are further divided into at least two additional sub-location areas.

14. The telecommunications system of claim 1, wherein said memory stores a location update threshold and wherein said mobile terminal performs a location update to said mobile switching center when said mobile terminal enters said given sub-location area but not when said mobile terminal enters said location area when the value of said ratio is below said threshold information and the number of location updates attempted by said mobile terminal is above said location update threshold.

15. The telecommunications system of claim 1, wherein said paging and updating information is associated with at least one subscriber category, said paging and updating information resulting in sub-location area paging when said subscriber category is set to heavy-user, said paging and updating information resulting in location area paging when said subscriber category is set to light-user.

16. The telecommunications system of claim 1, wherein said mobile terminal performs a location update to said mobile switching center when said mobile terminal enters said given sub-location area but not when said mobile terminal enters said location area when the value of said ratio is above said threshold information.

17. A method for optimizing the use of paging channels within a cellular network, said method comprising the step of:

dividing at least one location area within said cellular network into at least two sub-location areas;

determining paging and updating information associated with a mobile terminal in wireless communication with a mobile switching center within said cellular network, said mobile terminal being located within a given one of said sub-location areas, said paging and updating information comprising a ratio of the number of Pages attempted by said mobile switching center to said mobile terminal to the number of location updates attempted by said mobile terminal to said mobile switching center;

paging, by said mobile switching center, said mobile terminal on said paging channels within said given sub-location area and not paging said mobile terminal on said paging channels within at least one other of said at least two sub-location areas when the value of said ratio is above threshold information; and paging, by said mobile switching center, said mobile terminal on said paging channels within said location area when the value of said ratio is below said threshold information.

18. The method of claim 17, wherein said paging and updating information is associated with the amount of usage of said paging channels by said mobile terminal.

19. The method of claim 17, wherein said paging and updating information and said threshold information are stored in a memory within said mobile terminal.

20. The method of claim 19, wherein said memory is a Subscriber Identity Module card.

21. The method of claim 19, wherein said step of determining is performed by said memory within said mobile terminal.

22. The method of claim 17, wherein said step of determining is performed with a predefined time period.

23. The method of claim 17, further comprising, after said step of determining, the step of:

broadcasting, by at least one base station in wireless communication with said mobile terminal and connected to said mobile switching center, information associated with said location area and said sub-location area, said base station being located within said given sub-location area, said paging channels being associated with said base station.

24. The method of claim 17, further comprising the step of:

performing, by said mobile terminal, a location update to said mobile switching center when said mobile terminal enters said location area but not when said mobile terminal enters one of said at least two sub-location areas when the value of said ratio is below said threshold.

25. The method of claim 17, wherein said paging and updating information is stored in a home location register connected to said mobile switching center.

26. The method of claim 25, further comprising, after said step of determining, the step of:

sending, by said home location register, via said mobile switching center, said paging and updating information to said mobile terminal to be stored in a memory therein.

27. The method of claim 25, further comprising, after said step of determining, the step of:

sending, by said home location register, said paging and updating information to said mobile switching center, said mobile switching center using said paging and updating information to determine whether to page said mobile terminal within said location area or within said given sub-location area.

28. The method of claim 17, wherein said step of determining is performed by said mobile switching center, and further comprising, after said step of determining, the step of:

sending, by said mobile switching center, said paging and updating information to said mobile terminal for storage in a memory therein.

29. The method of claim 17, further comprising, after said step of dividing, the step of:

further dividing each of said sub-location areas into at least two additional sub-location areas.

30. The method of claim 17, further comprising the step of:

performing, by said mobile terminal, a location update to said mobile switching center when said mobile terminal enters said given sub-location area but not when said mobile terminal enters said location area when the value of said ratio is below said threshold information and the number of location update attempts by said mobile terminal is above a location update threshold.

31. The method of claim 17, wherein said paging and updating information is associated with at least one subscriber category, said paging and updating information resulting in sub-location area paging when said subscriber category is set to heavy-user, said paging and updating information resulting in location area paging when said subscriber category is set to light-user.

32. The method of claim 17, further comprising the step of:

performing, by said mobile terminal, a location update to said mobile switching center when said mobile terminal enters said given sub-location area but not when said mobile terminal enters said location area when the value of said ratio is above said threshold information.

33. A mobile terminal within a cellular network, said cellular network having at least one location area therein, said location area being divided into at least two sub-location areas, said mobile terminal comprising:

a memory for storing paging and updating information associated with said mobile terminal and threshold information, said paging and updating information comprising a ratio of the number of Pares attempted towards said mobile terminal to the number of location updates attempted by said mobile terminal;

sending means for sending a location update message to a mobile switching center in wireless communication with said mobile terminal within said cellular network, said mobile terminal sending said location update message when said mobile terminal enters one of said at least two sub-location areas but not when said mobile terminal enters said location area when the value of said ratio is above said threshold information; and receiving means for receiving a paging message from said mobile switching center, said mobile switching center transmitting said paging message on paging channels within one of said at least two sub-location areas but not in at least one other of said at least two sub-location areas when the value of said ratio is above said threshold information.

34. The mobile terminal of claim 33, wherein said memory is a Subscriber Identity Module card.

35. The mobile terminal of claim 33, further comprising determining means for determining said paging and updating information.

36. The mobile terminal of claim 33, wherein said determining means determines said paging and updating information within a predefined time period.

37. The mobile terminal of claim 33, wherein said paging and updating information is associated with the amount of usage of said paging channels within said cellular network by said mobile terminal.

38. The mobile terminal of claim 33, wherein said mobile terminal sends said location update message when said mobile terminal enters said location area but not when said mobile terminal enters one of said at least two sub-location areas when the value of said ratio is below said threshold information.

39. The mobile terminal of claim 33, wherein said mobile switching center transmits said paging message on paging channels within said location area when the value of said ratio is below said threshold information.

40. The mobile terminal of claim 33, wherein said mobile switching center sends said paging and updating information to said mobile terminal for storage in said memory therein.

41. The mobile terminal of claim 33, wherein said receiving means receives a broadcast message from at least one base station in wireless communication with said mobile terminal and connected to said mobile switching center, said broadcast message containing information associated with said location area and one of said at least two sub-location areas, said sending means using said information to send said location update message, said paging channels being associated with said at least one base station.

42. The mobile terminal of claim 33, wherein said memory further stores a location update threshold, said mobile terminal sending said location update message when said mobile terminal enters one of said at least two sub-location areas but not when said mobile terminal enters said location area when the value of said ratio is below said threshold information and the number of location updates attempted by said mobile terminal is above said location update threshold.

43. The mobile terminal of claim 33, wherein said paging and updating information is associated with at least one subscriber category, said paging and updating information resulting in sub-location area paging when said subscriber category is set to heavy-user, said paging and updating information resulting in location area paging when said subscriber category is set to light-user.

* * * * *

UNITED STATES PATENT AND TRADEMARK OFFICE
CERTIFICATE OF CORRECTION

PATENT NO. : 6,185,421 B1
DATED : February 6, 2001
INVENTOR(S) : Vladimir Alperovich et al.

It is certified that error appears in the above-identified patent and that said Letters Patent is hereby corrected as shown below:

Column 1,
Line 59, replace "PLNN" with -- PLMN --.

Column 9,
Line 60, replace "Pares" with -- pages --.

Signed and Sealed this

Twelfth Day of March, 2002

Attest:

JAMES E. ROGAN
Attesting Officer   Director of the United States Patent and Trademark Office